United States Patent
Kennedy, Jr.

(10) Patent No.: US 10,152,460 B2
(45) Date of Patent: Dec. 11, 2018

(54) ADAPTIVE COLUMN SELECTION

(71) Applicant: Vinyl Development LLC, Miami Beach, FL (US)

(72) Inventor: Thomas R. Kennedy, Jr., Miami Beach, FL (US)

(73) Assignee: Vinyl Development LLC, Miami Beach, FL (US)

( * ) Notice: Subject to any disclaimer, the term of this patent is extended or adjusted under 35 U.S.C. 154(b) by 0 days.

(21) Appl. No.: 15/196,306

(22) Filed: Jun. 29, 2016

(65) Prior Publication Data

US 2016/0306778 A1    Oct. 20, 2016

Related U.S. Application Data

(63) Continuation of application No. 14/641,652, filed on Mar. 9, 2015, now Pat. No. 9,400,776.

(51) Int. Cl.
  *G06F 17/00*  (2006.01)
  *G06F 17/21*  (2006.01)
  *G06F 17/24*  (2006.01)

(52) U.S. Cl.
  CPC .......... *G06F 17/212* (2013.01); *G06F 17/211* (2013.01); *G06F 17/245* (2013.01)

(58) Field of Classification Search
  CPC .................................................... G06F 17/245
  See application file for complete search history.

(56) References Cited

U.S. PATENT DOCUMENTS

| | | | |
|---|---|---|---|
| 5,333,253 A | 7/1994 | Kishihata | |
| 5,835,916 A * | 11/1998 | Inaki | G06F 17/247 715/212 |
| 5,883,635 A * | 3/1999 | Rao | G06F 3/023 345/440 |
| 6,313,855 B1 | 11/2001 | Shuping | |
| 6,389,437 B2 | 5/2002 | Stoub | |
| 6,556,217 B1 | 4/2003 | Makipaa et al. | |

(Continued)

OTHER PUBLICATIONS

Stack Overflow, "CSS: Truncate table cells, but fit as much as possible" answered May 2011, p. 1-8, available at http://stackoverflow.com/questions/5239758.

(Continued)

*Primary Examiner* — Amelia Tapp
(74) *Attorney, Agent, or Firm* — Fish & Richardson P.C.

(57) ABSTRACT

Methods, systems, and apparatus, including computer programs encoded on computer storage media, for adaptive column selection. One of the methods includes obtaining a size of a display area. The method includes obtaining column descriptors, each column descriptor identifying a column and a column width. The method includes determining a set of columns to present, including comparing the column width of a column to an available size remaining, and including the column in the set in response to determining that the column size is less than the available size. The method includes calculating an aggregate width of all the columns in the set. The method includes allocating a portion of the size to each column in the set of columns based on a ratio of width of the respective column and the aggregate width. The method also includes presenting the columns in the set of columns on the display area.

18 Claims, 18 Drawing Sheets

(56) References Cited

U.S. PATENT DOCUMENTS

| | | | |
|---|---|---|---|
| 6,639,611 B1* | 10/2003 | Leduc | G06F 17/245 715/236 |
| 6,642,945 B1 | 11/2003 | Sharpe | |
| 6,839,575 B2* | 1/2005 | Ostergaard | G06F 3/0481 455/566 |
| 6,966,028 B1 | 11/2005 | Beebe | |
| 7,047,033 B2 | 5/2006 | Wyler | |
| 7,082,576 B2 | 7/2006 | Shahine et al. | |
| 7,337,392 B2 | 2/2008 | Lue | |
| 7,362,311 B2 | 4/2008 | Filner et al. | |
| 7,516,402 B2 | 4/2009 | Koivisto et al. | |
| 7,725,815 B2* | 5/2010 | Peters | G06F 17/211 715/227 |
| 7,747,782 B2 | 6/2010 | Hunt et al. | |
| 7,886,226 B1 | 2/2011 | McCoy et al. | |
| 8,402,379 B2 | 3/2013 | Barak | |
| 8,533,628 B2 | 9/2013 | Rohrabaugh et al. | |
| 9,400,776 B1 | 7/2016 | Kennedy, Jr. | |
| 2005/0216858 A1 | 9/2005 | Fabritius | |
| 2006/0259853 A1 | 11/2006 | Zellweger | |
| 2008/0139191 A1 | 6/2008 | Melnyk | |
| 2008/0215963 A1 | 9/2008 | Kanemitsu | |
| 2009/0327965 A1 | 12/2009 | Averett et al. | |
| 2010/0033582 A1 | 2/2010 | Maeng et al. | |
| 2011/0074824 A1 | 3/2011 | Srinivasan et al. | |
| 2011/0107196 A1* | 5/2011 | Foster | G06F 17/245 715/227 |
| 2011/0126113 A1 | 5/2011 | Sharma et al. | |
| 2012/0072835 A1 | 3/2012 | Gross | |
| 2012/0131442 A1 | 5/2012 | Grizim et al. | |
| 2012/0278704 A1 | 11/2012 | Ying | |
| 2013/0021377 A1 | 1/2013 | Doll | |
| 2013/0145252 A1 | 6/2013 | Lie et al. | |
| 2013/0227398 A1 | 8/2013 | Bolstad | |
| 2014/0006982 A1 | 1/2014 | Wabyick | |
| 2014/0013271 A1 | 1/2014 | Moore et al. | |
| 2014/0157100 A1* | 6/2014 | Evans | G06F 17/245 715/227 |
| 2014/0157101 A1* | 6/2014 | Hogan | G06F 17/245 715/227 |
| 2014/0173394 A1 | 6/2014 | Kashibuchi | |
| 2014/0181646 A1 | 6/2014 | Rangwala et al. | |
| 2014/0208202 A1 | 7/2014 | Ellis | |
| 2014/0210863 A1 | 7/2014 | Osaka | |
| 2014/0245141 A1 | 8/2014 | Yeh et al. | |
| 2014/0281924 A1 | 9/2014 | Chipman et al. | |
| 2014/0337747 A1 | 11/2014 | Koon | |
| 2014/0368547 A1 | 12/2014 | Elings | |
| 2014/0372419 A1 | 12/2014 | Li | |
| 2015/0019958 A1 | 1/2015 | Ying | |
| 2015/0067463 A1 | 3/2015 | Chin | |
| 2015/0100874 A1 | 4/2015 | Pallakoff | |
| 2015/0116363 A1 | 4/2015 | Monte | |
| 2015/0135052 A1* | 5/2015 | Thompson | G06F 3/0481 715/227 |
| 2015/0161141 A1 | 6/2015 | Evans | |
| 2015/0199113 A1 | 7/2015 | Prabhat | |
| 2015/0269128 A1 | 9/2015 | Hepper | |
| 2016/0162448 A1* | 6/2016 | Wang | G06F 17/212 715/236 |
| 2016/0266749 A1 | 9/2016 | Kennedy, Jr. | |

OTHER PUBLICATIONS

W3schools.com, CSS visibility property, p. 1-7, retrieved from http://www.w3schools.com/cssref/pr_class_visibility.asp on Oct. 11, 2015.

W3C, CSS Multi-column Layout Module, W3C Candidate Recommendation Apr. 12, 2011, p. 1-18, available at http://www.w3.org/TR/2011/CR-css3-multicol-20110412.

* cited by examiner

```
1502 ─  var available space = RoundDown(uiWidth / characterWidth)
        var columnsSortedByPriority = sortColumnsByPriority(columns);
        var charactersAllocated = 0;

foreach (var column in columnsSortedByPriority) {
1506 ─     column.width += paddingAdjustment;
           if (availableSpace – column.width < 0 && availableSpace >
              squeezeThreshold) {
1508 ─         if (column.canBeClipped) {
1510 ─             column.width = availableSpace;
               }
           }
1512 ─     availableSpace -= column.width
1514 ─     if (availableSpace > 0 || column.priority == 1 || visibleColumns == 0) {
1516 ─         charactersAllocated += column.width;
1518 ─         column.visible = true;
           } else {
1520 ─         column.visible = false;
           }
        }
1522 ─  foreach (var column in columnsSortedByPriority) {
           if (column.visible) {
1524 ─         column.percentSpace = column.width / charactersAllocated;
           }
        }

1526 ─  var visibleColumns =
           sortColumnsByDisplayOrderVisible(columnsSortedByPrioriy return visibleColumns;
```

FIG. 15

ADAPTIVE COLUMN SELECTION

CLAIM OF PRIORITY

This application is a continuation application and claims priority under 35 USC § 120 to U.S. patent application Ser. No. 14/641,652, filed on Mar. 9, 2015, the entire contents of which are hereby incorporated by reference.

BACKGROUND

This specification relates to graphical displays.

Users may access systems and programs using a wide variety of different devices. The range of devices extends from desktops to notebooks and laptops, to tables and smartphones. The devices have a wide range of screen sizes and resolutions. It is desirable, however, to present useful content to a user regardless of the device they are using to access the information.

SUMMARY

In general, one innovative aspect of the subject matter described in this specification can be embodied in methods that include the actions of obtaining a size of a display area. The method includes the action of obtaining column descriptors, each column descriptor identifying a column and a column width. The method includes the actions of determining a set of columns to present, including comparing the column width of a column to an available size remaining in the display area, and including the column in the set in response to determining that the column size is less than the available size. The method includes the actions of calculating an aggregate width of all the columns in the set. The method includes the actions of allocating a portion of the size of the table to each column in the set of columns based on a ratio of width of the respective column and the aggregate width. The method also includes the actions of presenting the columns in the set of columns on the display area.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include the actions of adjusting the column width of the column by a column padding factor. The methods may include the actions of sorting the column descriptors based on a priority associated with each column. The methods may include the actions of determining to include a column in the set based on a priority associated with of the column. The methods may include the actions of determining whether a column can be compressed in response to determining that the column size is greater than the available width. The methods may include the actions of determining to include the column in the set of columns in response to determining that the columns can clipped. Determining to include the column may include determining that available space exceeds a squeeze threshold that defines a minimum length to be allocated to a clipped column.

Particular embodiments of the subject matter described in this specification can be implemented to realize one or more of the following advantages. The presentation of display data is more attractive and easier for a user to comprehend. The most important information is prioritized over less important information. The available display is better utilized.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

FIG. 15 illustrates example pseudo-code to perform the process.

Like reference numbers and designations in the various drawings indicate like elements.

DETAILED DESCRIPTION

A system described below can customizing the presentation of content based on the size of the viewing screen that enables a single version of the content to be attractively presented across all user devices. Different user devices have screens of differing sizes. Content that is designed for one device may not be suited to another device. For example, text designed to be displayed on a 22 inch monitor may appear excessively small when presented on a smart phone.

Similarly, an image designed for a smart phone may look pixelated when presented on the 22 inch monitor. A web page designed to a tablet may include excessive white space when presented on a computer monitor.

Instead of creating a single web page for presentation on a computer, the system uses a series of standard smaller panels. The system selects which panels to present based on the content that has already been displayed, the content that remains to be displayed, and the size of the screen of the user device.

Figure 1:
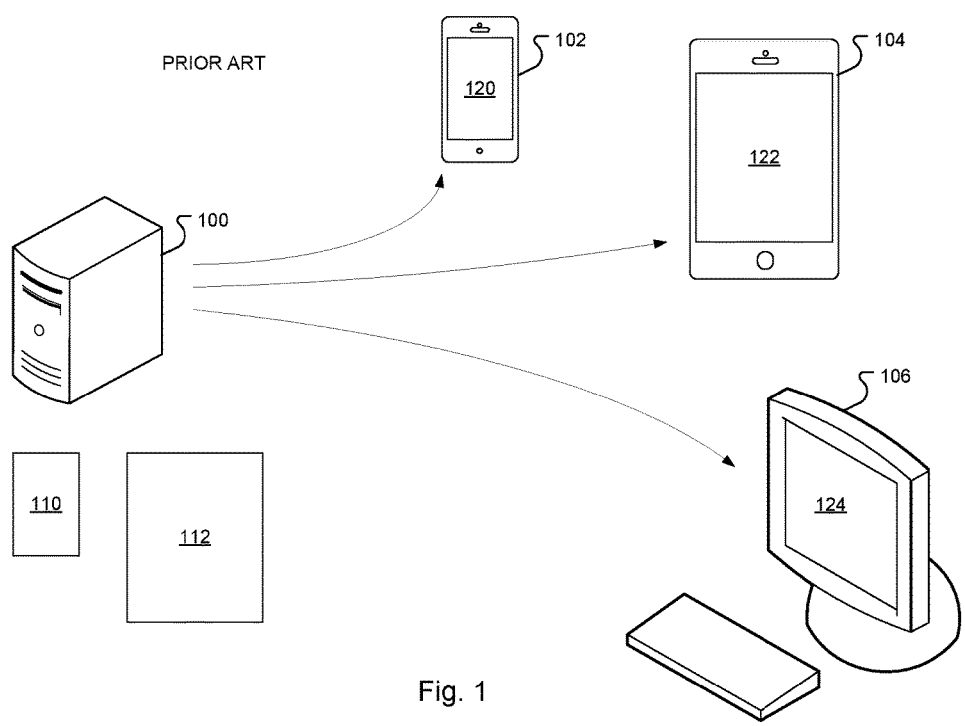
FIG. 1 illustrates a traditional content distribution system that provides content to different user devices.

FIG. 1 illustrates a traditional content distribution system for different user devices. A webserver 100 provides content to different user devices. For example, a user on a smartphone 102, a user of a tablet 104, and a user of a personal computer 106 may each request a webpage from the webserver 100. Each of these user devices include display characteristics that are employed to present the webpage or other asset of interest. For example, a typical smart phone has a screen size of less than 5 inches, measured along the diagonal expanse of the screen. A typical tablet computing device may have a screen size that ranges, for example, from 6 inches to 11 inches or more. A typical monitor of a personal computer may have a screen size from 11 inches, for a small laptop, to 40 inches or more. As a further complication, some smart phones and tablets can dynamically change the page-orientation of their display, e.g., from portrait to landscape, depending on the orientation that the user holds the device.

In general, a webpage is a document that is suitable for transmission a network (for example, the World Wide Web) and display on a web browser. A webpage may include hypertext, scripts, and may potential interact with programs embedded in the web browser (for example, plug-ins). Typical web pages provide hypertext that can include navigation to other web pages via hyperlinks, often referred to as links.

On a network, a web browser being executed by a user device can retrieve a web page from a remote web server. The web server may restrict access to only a private network, such as a corporate intranet, or it provides access to the World Wide Web. A web browser may request a web page by a web server using a request sent over the network, for example a Hypertext Transport Protocol (HTTP) request.

A static web page is delivered exactly as stored (as web content in the web server's file system) while a dynamic web page is generated by a web application that is driven by server-side software or client-side scripting. Dynamic web pages help the web browser (the client) to enhance the web page through user input to the server.

To provide a good user experience of devices of different screens, a traditional system may provide different versions of a single web page. For example, a mobile version 110 of a webpage may be provided for presentation on a smart phone 102. A full html version 112 of the webpage may be provided for presentation on the tablet of the personal computer. The mobile version 110 is generally smaller than the full html version 112 in order to accommodate the smaller screen on mobile devices. Generally, each version of the webpage has to be developed and tested separately.

Web pages designed for one screen are not as attractive and usable when presented on a screen of a different size. Generally, a webpage is designed to be presented in a particular user interface having an orientation, size and aspect ratio. Forcing the web page to fit into a user interface for which it was not designed reduces the quality of the presentation. For example, designed to generally remain in a static position a typical monitor of a personal computer predominately presents one display orientation (e.g. landscape), while a user interface for a tablet can adapt for multiple orientations (e.g., landscape, portrait, etc.) depending on user preference. A webpage that is designed to be presented in one orientation may not be suitable for presentation in another. For example, a web page designed to be presented in a portrait view may include borders on either side which contain no content when displayed on a landscape user interface.

Similar to orientation other physical characteristics of the display can affect the quality of the user experience. For example, a web page designed to be presented on a 21 inch monitor may be illegible if presented on a 9 inch tablet. User interface displays may also have different aspect ratios. For example, some have a 4:3 ratio (i.e. four units of width for every three units of height), while others present content in a 16:9 (i.e. 16 units of width for every nine units of height) or 16:10 ratio (i.e. 16 units of width for every ten units of height).

Because of the wide variety in orientation, size, and aspect ratio, traditional web page delivery and display systems inefficiently utilize the user interface of most devices.

Figure 2:
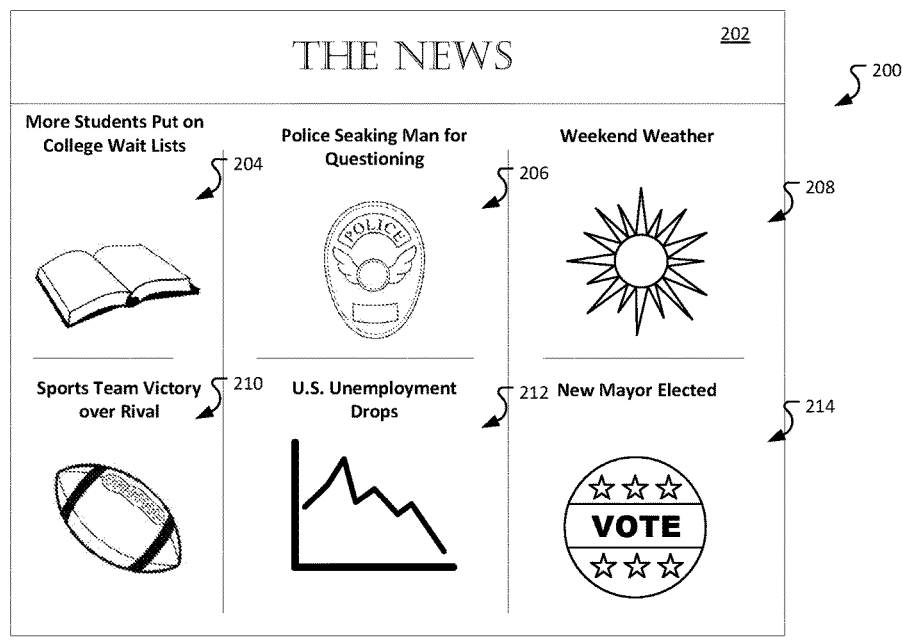
FIG. 2 illustrates an example of a web page.

Referring to FIG. 2, a typical webpage is illustrated that contains multiple portions that may be individual or on a whole effected by the display of the webpage on different user devices. In this example, the web page 200 is a web page for a local newspaper (i.e., "The News"). The web page 200 includes a header area 202 which presents the title of the web page. The web page also includes several stories each represented by a single graphic. The stories arranged in the columns: a story about college wait lists 204, a story about a sports team 210, a story about a man wanted by the police 206, a story about the unemployment rate 212, a story about the weather 208, and a story about the mayor election 214.

One or more techniques may be employed to represent the web page 200, for example the web page may be developed in advance, (e.g. a static web page) or may be constructed dynamically accord to rules and programs (e.g., java server pages, servlets, active server pages, etc.) A static web page does not change its content, however, a dynamic page may be programmed to change its content over time.

To provide content to different displays (e.g. displays having different sizes, resolutions, orientations, and/or aspect ratios), a web server may keep multiple versions of the web page; for example, there may be one version of the web page that is delivered to traditional web browsers and a second version of the web page that is delivered to web browsers on devices with a smaller form factor, such as a smart phone. Maintaining multiple versions of the web page increases the cost associated with delivering content. Each version of the web page has to be developed and tested. Any change to the web page needs to be replicated in each version of the web page.

The system described below provides a system where content for a web page can be developed once and then delivered to devices having different screen sizes. The system determines how much information to display on the user device and, when the available content exceeds the available screen size, provides easy navigation between the content. Content is created within panels of predetermined size. A page is made up of one or more panels. Based on the size of the display of a user device one or more panels can be selected to be displayed on the user device. The panels that are selected to be displayed together are referred to as a slide.

Figure 3:
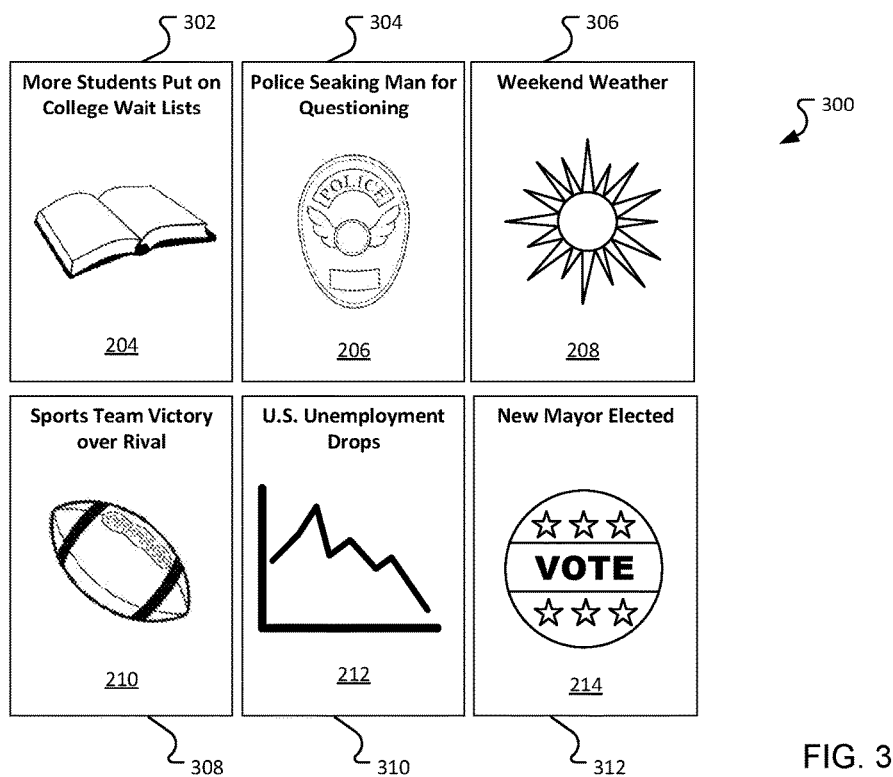
FIG. 3 illustrates an example page for providing content using panels.

Each panel is a standard size user interface element that can display content on a user interface. For example, referring to FIG. 3, content for a page is divided into panels. In general, a panel contains content to be presented to the user. In this example, the content of the web page 200 of FIG. 2 has been placed into panels. A panel 302 includes the story about college wait lists 204, the panel 304 includes the story about a man wanted by the police 206, the panel 306 includes the story about the weather 208, the panel 308 includes the story about a sports team 210, the panel 310 includes the story about the unemployment rate 212, and panel 312 includes the story about the mayor election 214.

As shown above, a single web page may include several panels of content. The panels may be a collection of rows of data, or it may be a single record of data. It can be formatted in a structured way, such as tabular (in both a horizontal tabular format and a vertical tabular format), or it may be unstructured in a user-defined custom format.

The size of a panel can be selected so that any screen that is designed to display web content will display at least one panel (that is, any given user interface will display at least a single panel). The panel can be thought of as atomic units of content that can be presented on a user device.

Once created panels can be combined and displayed on different user devices having different displays. A panel only needs to be created once and then it can be different user devices that have different display characteristics while maintain a high quality user experience. Because each panel only needs to be created once, the cost of delivering content to users is reduced, the cost of maintaining the content is similarly reduced, and the quality of the user experience is improved.

Figure 4:
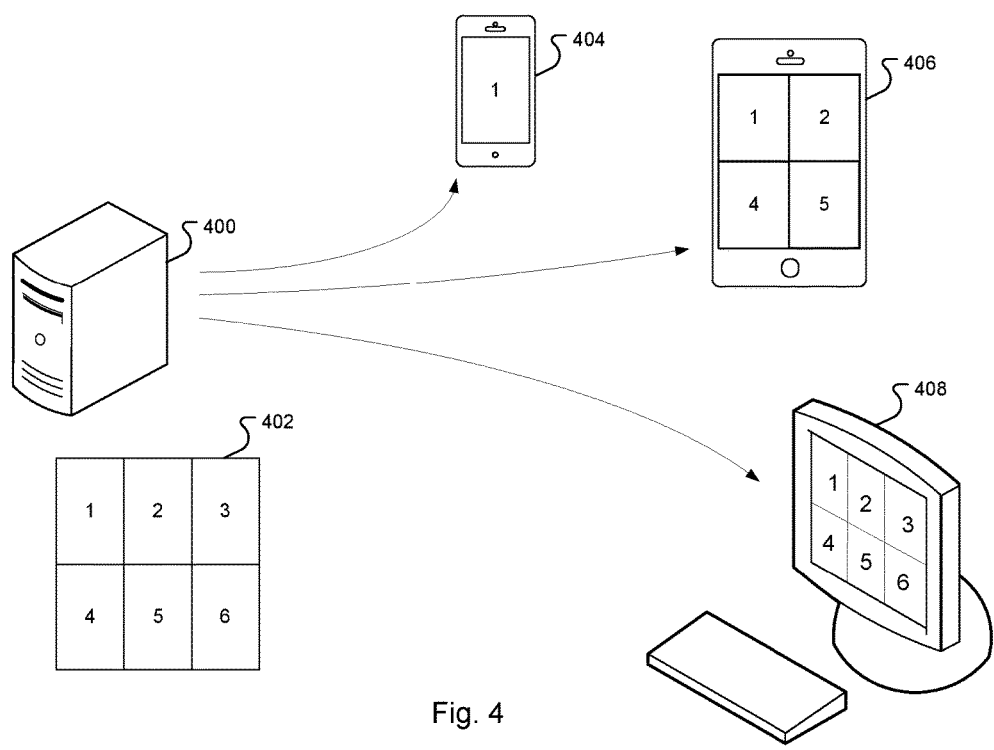
FIG. 4 illustrates an example of providing different slides to different user devices.

FIG. 4 illustrates an example of providing different slides to different user devices. A user interface of a user device may be capable of displaying more than one panel at a time. The system can select multiple panels to display simultaneously on the user device. These panels are combined together into a slide. The slide is presented on the user device. In general, the size of a panel is predetermined based on either a predetermined size or the size of the content. In contrast, the size of the slide is dependent on the size of the display on the user device.

The web server sends different slides to different devices. For example, a small user device with a relatively small-sized display (for example a smart phone 404) may be capable of displaying one or relatively few (e.g. one of the six panels) and therefore receives a relatively small slide. A medium size user device (for example a tablet 406), may display more than a few panels (e.g. four of the six panels) and therefore receives a medium size slide. A large user device (for example the personal computer 408) may display all six of the panels and therefore receives a large slide. Customizing each slide to the separate user devices provides a good user experience to all devices.

Slides can be sent to a user device either singularly or in groups. In some implementations, the webserver only provides the user device one slide at a time. The slide includes the panels that the user device is instructed to display. In other implementations, the web server 308 sends all of the slides to display the page to the user device when the page is requested. In some implementations, client-side software on the user device can segment and present the appropriate slides to the user of the device. The software may be embedded in the requested page or sent in one or multiple additional files. In other implementations, the web server 308 can send the panels to the user device and the client side software on the user device can generate the slides dynamically.

Figure 5:
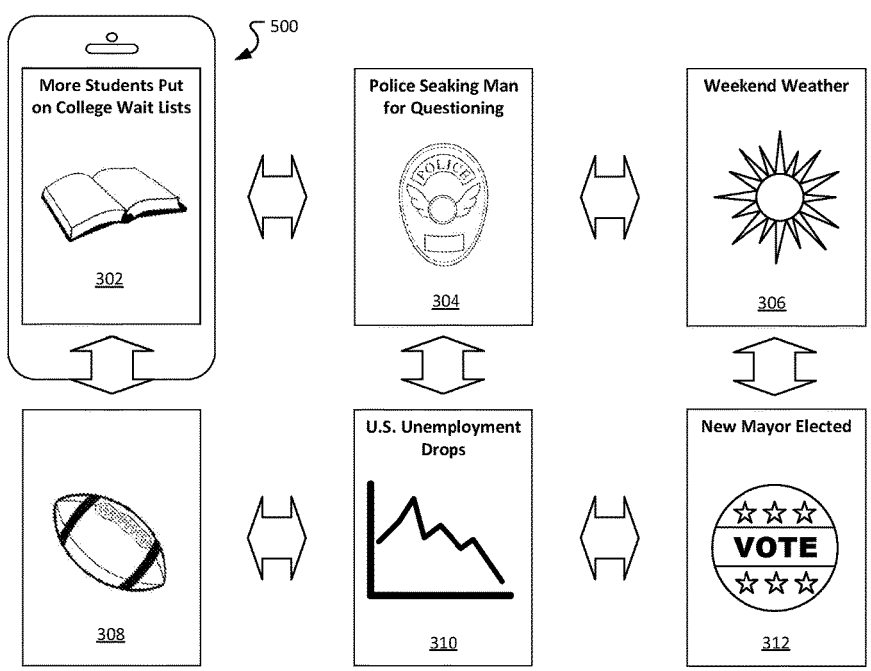
FIG. 5 illustrates navigating between slides on a user device.

Referring to FIG. 5, when a page is delivered to a user device, it includes the ability to navigate between slides. In this example, a smart phone 500 displays a slide that includes a single panel: panel 302 that includes the story about college wait lists. The user may navigate between the sides, for example, by interacting with the device (e.g., by selecting a link, swiping the touch sensitive screen, etc.). Using these navigation techniques the user can cause different sides to be presented. In this example, the user can navigate to a slide that includes panel 304, a slide that includes panel 306, a slide that includes panel 308, a slide that includes panel 310, and a slide that includes panel 312 to be displayed. In some implementations, navigation may be limited to a left/right navigation in which, for example, panel 308 is located to the right of panel 306. In some implementations, navigations may be in any direction.

Figure 6:
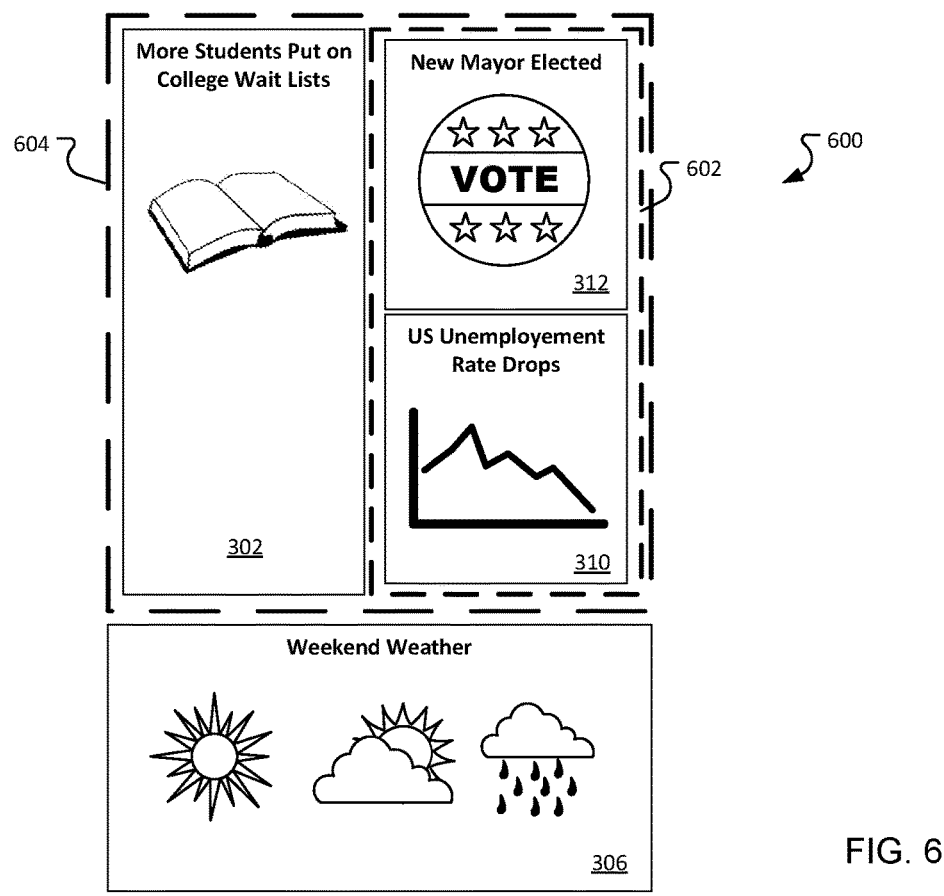
FIG. 6 illustrates an example of a page that includes panels organized by a layout.

FIG. 6 illustrates an example of a page that includes panels organized by a layout 600. In addition to panels, a page may also include a layout. The layout of a page defines how panels should be displayed when they are all visible on the screen. For example, some panels may be stacked vertically (panel 302 is above panel 306) while some panels might be stacked horizontally (panel 302 is to the left of panel 312). Panels may also be grouped such that panel 312 can be above panel 310 while both panels are to the right of panel 302.

In this example, panel 312 is positioned above panel 310. Panel 312 and panel 310 make up group 602. Panel 302 is beside group 602. Panel 302 and group 602 make up group 604. Group 604 is positioned above panel 306.

Figure 7:
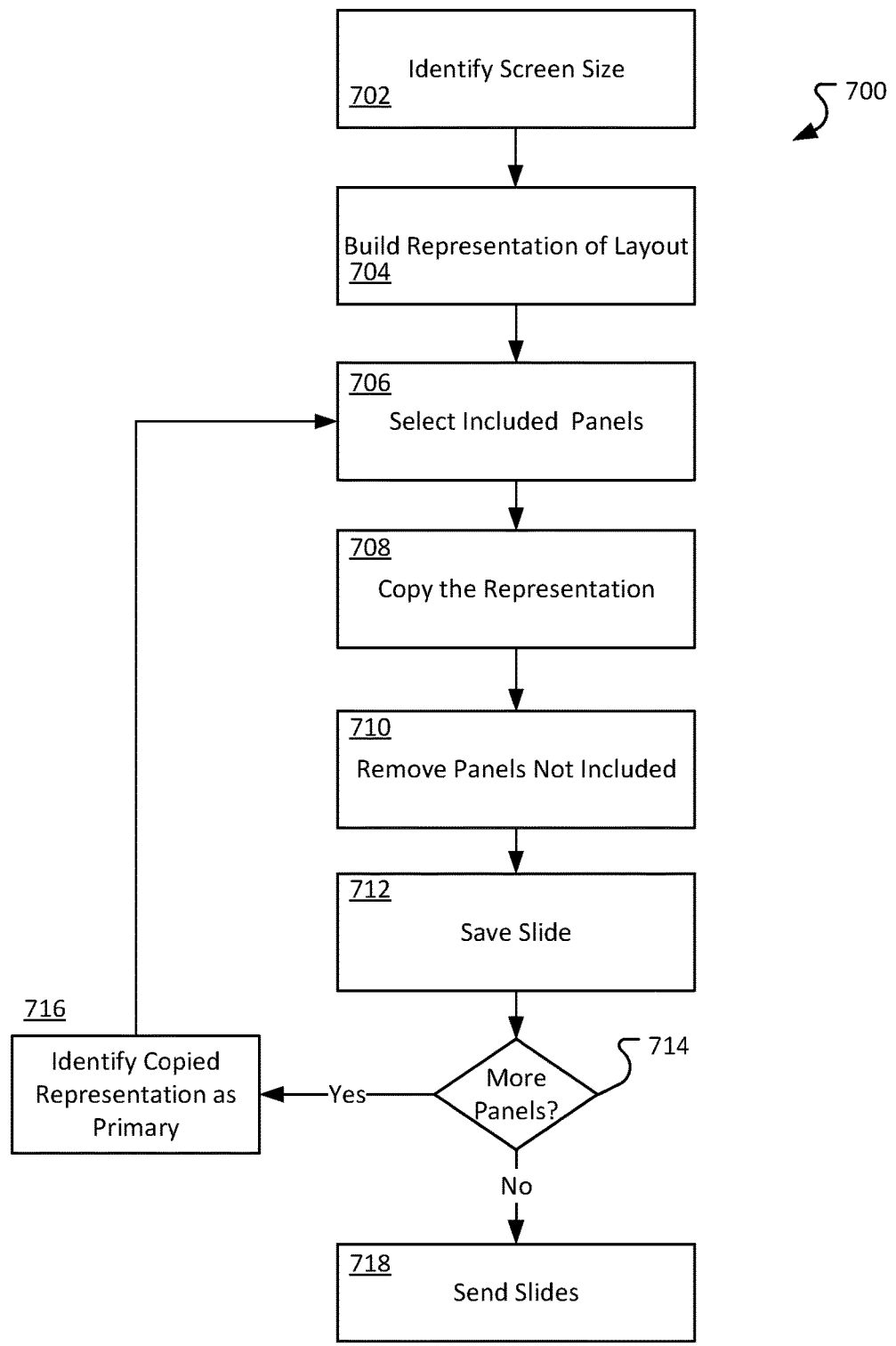
FIG. 7 is a flow chart for an exemplary process for generating slides from a page.

FIG. 7 is a flow chart for an exemplary process 700 for generating slides from a page. The process can be performed by one or more computing devices each include one or more processors and memory. The operations of the process can be performed on a single computing device or may be distributed across multiple computing devices. The production of slides can occur on a web server or other server-side computing device, or may be performed by the user device, as discussed above. In some implementations, the process may be initiated, for example, in response to a request for a page to be delivered to the user device. In some implementations, the process may be initiated by the delivery of a page to the user device. The process may be initiated in response to other stimuli.

The process determines the display characteristics (e.g. size) of the display of the user device 702. General sizing information may be provided by the user device. For example, the user device may provide the number of pixels the screen can display. In some implementations, the process calculates the number of lines (vertical and horizontal) of text that can appear on the screen. The size of a panel can be measured using the number of characters that can be displayed on the panel. For example, a standard panel may be 18 characters high and 24 characters wide. That is, a panel may be designed to display 18 lines of text, each line including 24 characters. As many fonts are proportional (e.g., the font includes characters of varying widths), the width of a character may be determined to be the width of the widest character in a predetermined font. Alternatively, the size of the panel is determined using a pre-determined non-proportional font, which uses a single standard width for all characters. In some implementations, a portion of the screen may be reserved for the presentation of a banner, menu, or other information. For example, a header including "The News" may be displayed regardless of the current slide.

To determine the number of panels that can be displayed on the user device, the process determines a height for a panel on the user device. In some implementations, the height of the panel may be determined using the formula:

$$\text{Panel Height} = \text{Lines of Text} \times \text{Character Height in Pixels} \quad (1)$$

For equation 1, panel height is the height of a panel in pixels, lines of text is the number of lines of text included in a standard panel, and character height in pixels is the height of a character in pixels. In some implementations, the height of a character in pixels may be dependent on information provided from the user device. For example, the user device may provide preferred font and font size information.

The process also determine the width for a panel on the user device. In some implementations, the width of the panel may be determined using the formula:

$$\text{Panel Width} = \text{Characters in Line} \times \text{Character Width in Pixels} \quad (2)$$

For equation 2, panel width is the width of a panel in pixels, characters in line is the number of character included in a line of text in the standard panel, and character width in pixels is the determined width of a character in pixels. In some implementations, the width of a character in pixels may be dependent on information provided from the user device. For example, the user device may provide preferred font and font size information.

In some implementations, the lines of text and characters in line values may be predetermined constants (for example, 18 and 24 respectively).

The process determines a number of vertical panels. In some implementations, the number of vertical panels can be determined using the formula:

$$\text{Vertical Panels} = \text{Screen Height}/\text{Panel Height} \quad (3)$$

For equation 3, vertical panels is the number of panels that can be displayed vertically on the user interface, screen height is the height of the user interface in pixels, and panel height represents the panel height as calculated using equation 1, above. In some implementations, the vertical panels value is rounded down to the nearest whole number. For example, if the formula above determines that 2.1 vertical panels can be displayed on the user interface of the user device, the process may assign the value 2 to the vertical panels.

In some implementations, the number of vertical panels has a minimum value of 1.

Similarly, the process determines a number of horizontal panels. In some implementations, the number of horizontal panels can be determined using the formula:

$$\text{Horizontal Panels} = \text{Screen Width}/\text{Panel Width} \quad (4)$$

For equation 4, horizontal panels is the number of panels that can be displayed horizontally on the user interface, screen width is the width of the user interface in pixels, and panel width represents the panel width as calculated using equation 2, above. In some implementations, the horizontal panels value is rounded down to the nearest whole number.

In some implementations, the number of vertical panels has a minimum value of 1. In some implementations, the number of panels that can be displayed (horizontally or vertically) is rounded down to the nearest integer. In other implementations, the system may be adjustable to support partial panels, as discussed below.

The process builds 704 an in memory representation of the layout. The representation can be, for example, a data structure (e.g. a tree, a string) that identifies different panels and groups. For example, referring again to FIG. 6, the layout 600 may be represented by the string "(Panel 302: (Panel 312/Panel 310))/Panel 306." In this representation, the parenthetical denote a group and the forward slash denotes that the panels are located vertically; that is, one panel or group above the other panel or group. The colon is used to denote panels that are located horizontally; that is, one panel or group is next to the other panel or group.

The process 700 selects 706 included panels. Based on the size of the screen as calculated above, the process identifies panels that can be included on a slide. In some implementations, the process selects panels starting at the top of the layout. The process may select panels to preserve the layout. For example, if the user interface can display 1 horizontal row of panels and 2 vertical columns of panels, the process will first select panels that are presented side by side. Selected panels may be denoted in the representation using one or more characters (for example, an asterisk). For example graphically illustrated in FIG. 6, the process determines to present Panel 302 and Panel 312 on the user device. The process update the representation to indicate that Panel 302 and Panel 312 have been selected. For example, the process may identify the selected panels using an *, such as "Panel 302*: (Panel 312*/Panel 310))/Panel 306." Examples describing techniques for selecting panels are described further below.

In some implementations, the process may determine that partial panels may be displayed on the screen. For example, the system may be able to compress some panel to fill an available area when a user device is capable of displaying a non-integer number of panels (e.g. two and half panels.).

Returning to FIG. 7, the process 700 copies 708 the representation. Once the selected panels are identified in the representation, the representation contains two disparate pieces of information. Specifically, the panels that are to be included in the slide and the panels that are not included in the slide. Copying the representation allows the representation to be manipulated to generate a slide while preserving information about the panels that were not selected.

The process 700 removes 710 panels that are not included in the slide from the representation. The remaining panels are included in the slide. For example, referring to FIG. 6, the process may remove Panel 310 and Panel 306 from the representation.

The process 700 saves 712 the slide. The process stores a slide that includes the panels for delivery to the user device. For example, the system may store the remaining representation if the process determines to include Panel 302 and Panel 312 in the slide, the process removes the remaining panels from the model "Panel 302: Panel 312" In some implementations, the model can be saved as a slide. In some implementations, grouping information and flagging information are removed from the representation before it is saved as a slide. In other implementations, the process generates a slide using the model information; for example, the process can generate an HTML page that includes the selected panels.

The process 700 determines 714 if there are any panels not included in a panel. For example, the process can examine the copy of the representation and determine if there are any panels that have not been flagged.

If there are unselected panels, then the process 700 identifies 716 the copy of the representation as the primary representation. In some implementations, the process can remove panels that have already been included in a slide. For example, given the representation "Panel 302*: (Panel 312*/Panel 310))/Panel 306", the process 700 may remove "Panel 302*" and "Panel 312*" from the representation. The process 700 may update the grouping information, removing groups that include only a single panel. In this example, the new representation may be "Panel 310/Panel 306." Subsequently, the process 700 may continue with step 706 as described above.

Once all of the panels on the page have been included in a slide, the process 700 sends 718 the slides to the user device.

Figure 8:
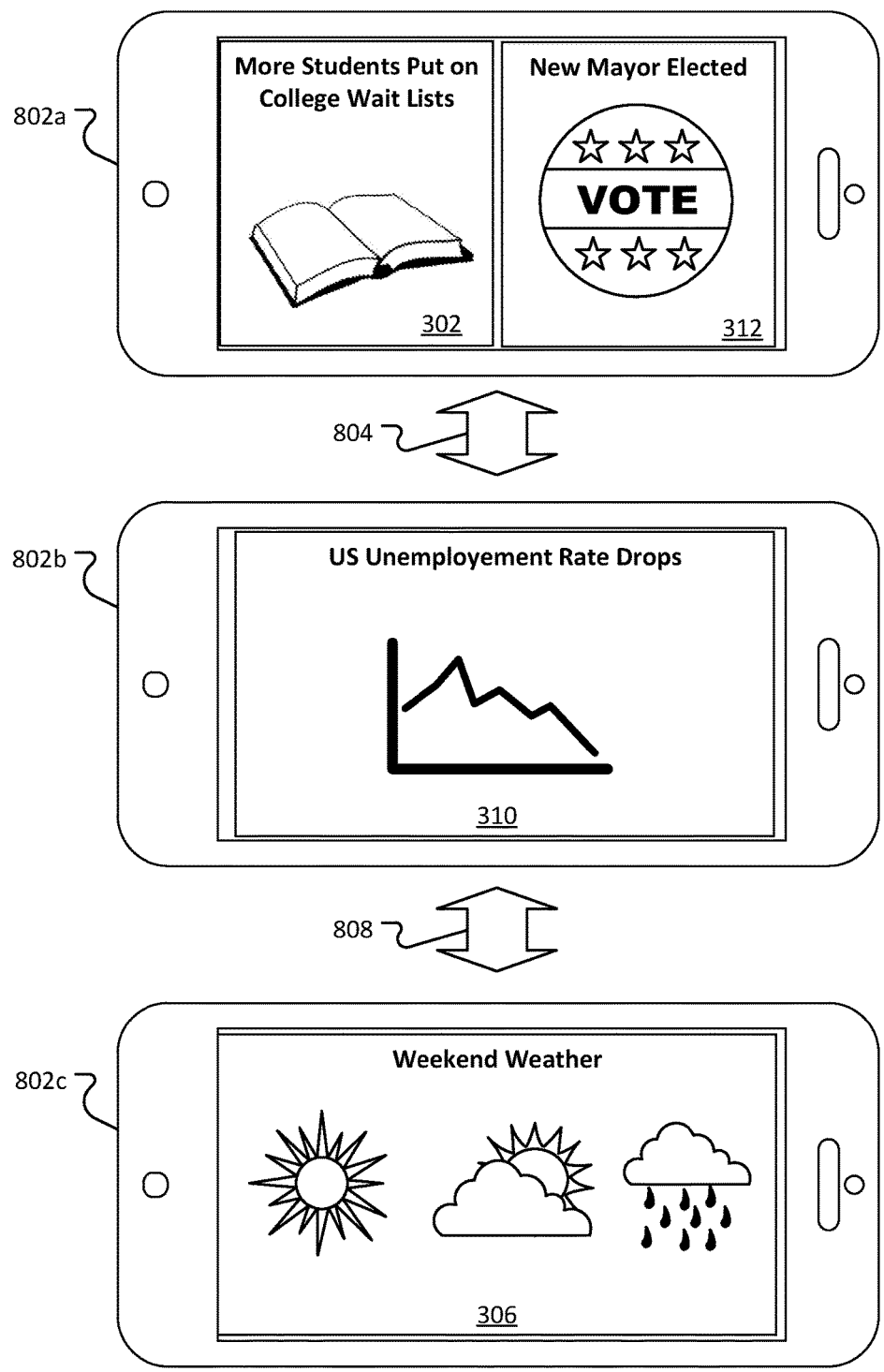
FIG. 8 illustrates an example of delivering slides to a user device.

FIG. 8 illustrates an example of presenting multiple slides individually presented on a user device. The example illustrates presenting the layout described on FIG. 6 on a device that can display one row of panels and two columns of panels (1×2).

As described above, the layout of FIG. 6 may be described using a representation:

(Panel 302: (Panel 312/Panel 310))/Panel 306

Starting at the upper left of the layout, the system selects panel 302 and panel 312 to include on the first slide (as shown in the user interface of the smart phone 802a). Panel 302 is selected because it is in the first panel in the representation (that is, the left-most panel in the above). Panel 312 is selected because it can be positioned next to panel 304 horizontally. Once the first slide has been selected, the remaining slides can be described using the representation:

Panel 310/Panel 306.

The representation indicates that panel 310 should be presented above panel 306. As the user interface can only display a single row of panels, the next slide includes only panel 310 (as shown on the user interface of the smart phone 802b). Panel 310 is selected because it is in the left most position of the representation. However, because there are no panels that can be positioned next to panel 310, horizontally, panel 310 is presented alone on the slide. In some implementations, the panel 310 may be expanded to fit the available space on the user interface. Once the second slide has been selected, the remaining slides can be described using the representation:

Panel 306.

The final slide includes panel 306 as shown on the user interface of the smart phone 802c. In this example, smart phone 802a-c represents a single smart phone presenting different slides, as described above. Users can navigate between the slides, for example by using a swipe motion, following links, or other navigation method. In some implementations, as represented by double arrows 804 and 808, navigation may be bi-directional. A user may navigate from a first slide to a second slide though one navigation methods (for example, a left swipe) and may navigate from the second slide to the first slide using another navigation method (for example, a right swipe).

Figure 9:
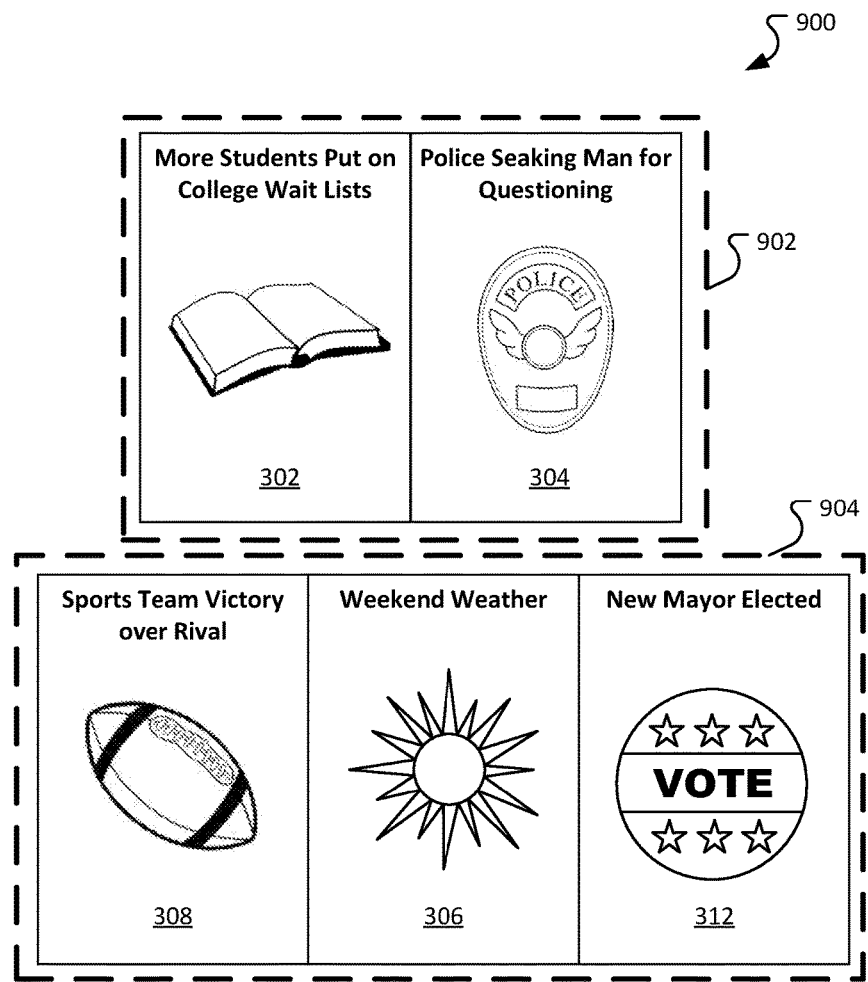
FIG. 9 illustrates a layout of panels.

FIG. 9 illustrates a different layout 900 of panels. As described above, the layout determines how panels are arranged in slides. Different presentations can be created with the same slides by altering the layout. The layout 900 for the page includes two groups with the first group 902 positioned above the second group 904. The first group 902 includes the panel 302 and the panel 304 positioned horizontally. The second group 904 includes the panel 308, the panel 306, and the panel 312 all positioned horizontally. Using the representation notation described above the layout made the described using the string:

(Panel 302: Panel 304)/(Panel 308: Panel 306: Panel 312)

Figure 10:
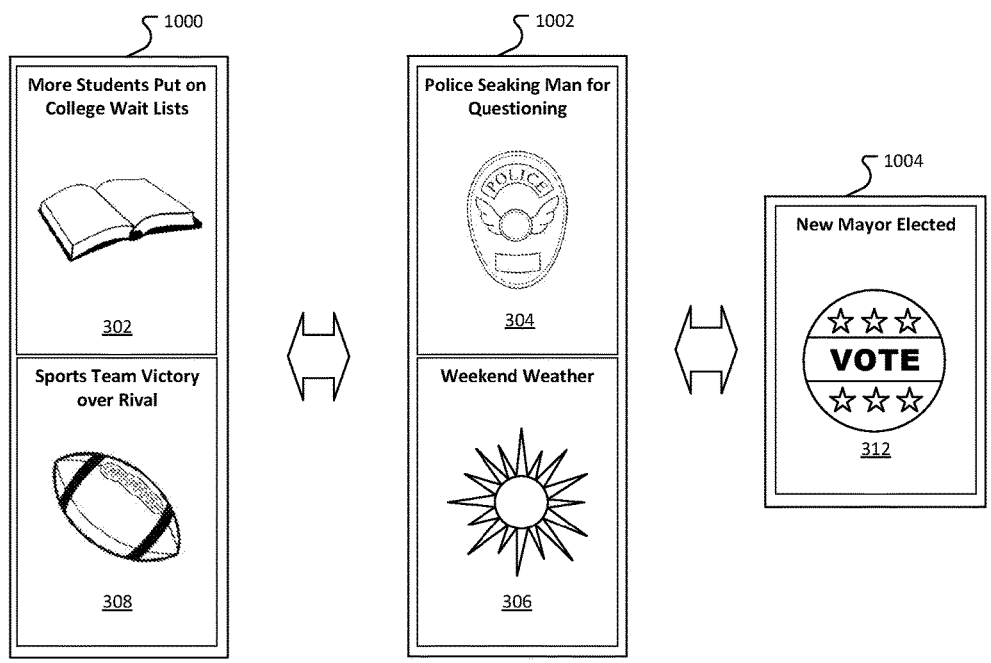
FIG. 10 illustrates an example of delivering slides to a user device.

FIG. 10 illustrates an example of slides generated for presentation on a user device based on the layout 900 of FIG. 9. In this example, the user device requesting the page can display two rows of panel of panels (2×1).

To generate the first slide 1000, the system selects the first panel (the leftmost panel) in the representation (in this case panel 302). The system identifies the leftmost panel that can be presented beneath panel 302 (in this example, panel 308). The system then generates a first slide 1000 including panels 302 and panel 308. After the slide 1000 is generated, the representation may be represented using the string representation:

Panel 304/(Panel 306: Panel 312)

To generate the second slide 1002, the system selects the first panel (the leftmost panel) in the representation (in this case, panel 304). The system identifies the leftmost panel that can be presented beneath panel 304 (in this example, panel 306). The system then generates a second slide 1002 including panels 304 and panel 306. After the slide 1002 is generated the representation may be represented using the string:

Panel 312

To generate the third slide 1024, the system selects the first panel (the leftmost panel) in the representation (in this case, panel 312). As there are no other panels remaining in the representation, panel 312 is included alone in the third slide 1004.

Figure 11:
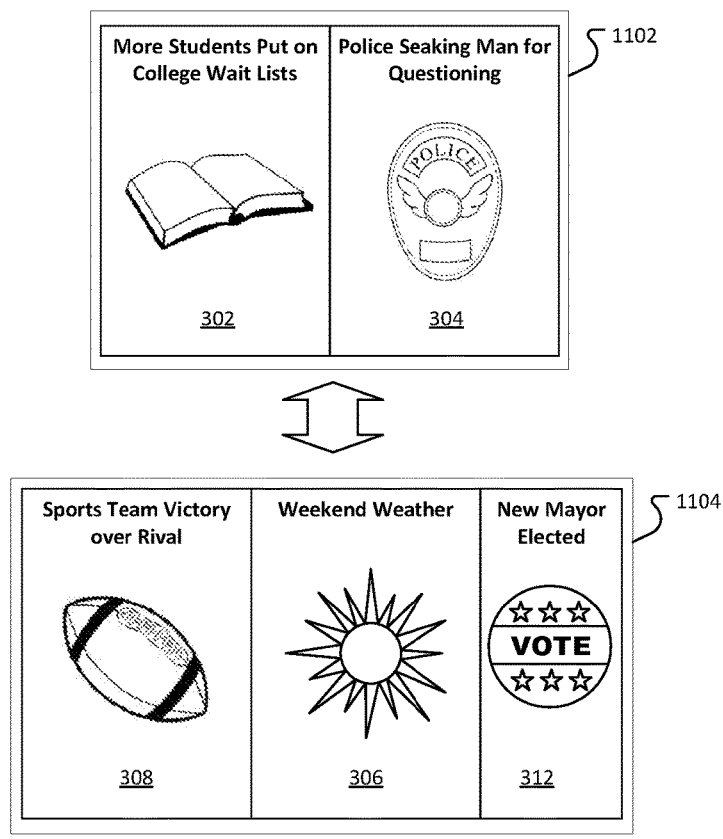
FIG. 11 illustrates an example of delivering slides to a user device.

FIG. 11 illustrates another example of delivering slides to a user device based on the layout 900 of FIG. 9. As described above, in some scenarios, a user device may be able to display partial panels. For example, a user device may be capable of displaying one row of panels and two and a half columns of panels.

As discussed above, the layout 900 of FIG. 9 may be described using the string.

(Panel 302: Panel 304)/(Panel 308: Panel 306: Panel 312)

To generate the first slide 1102, the system selects the top left paten first panel in the representation. The system identifies the leftmost panel that can be presented to the right of panel 302 (in this example, panel 304). The system then generates a first slide 1102 including panels 302 and panel 304. The system determines that the user device can present a half a panel; however, as no panel can be presented to the right of panel 304, the system does include any additional panel. During presentation of the user device, the panels 302 and 304 may be expanded to fill the available display area of the user device.

After the slide 1102 is generated, the representation may be represented using the string representation:

(Panel 308: Panel 306: Panel 312)

To generate the second slide 1104, the system selects the first panel (the leftmost panel) in the representation (in this case, panel 308). The system identifies the leftmost panel that can be presented to the right of panel 308 (in this example, panel 306). The system identifies the left most panel that can be presented to the right of panel 306 (in this example, panel 312). However, because the user device can only display half of a panel, the system determines whether the panel 312 can be compressed sufficiently to fit into the available space. The process for compressing a panel to fit into a compressed space is discussed further below.

Figure 12:
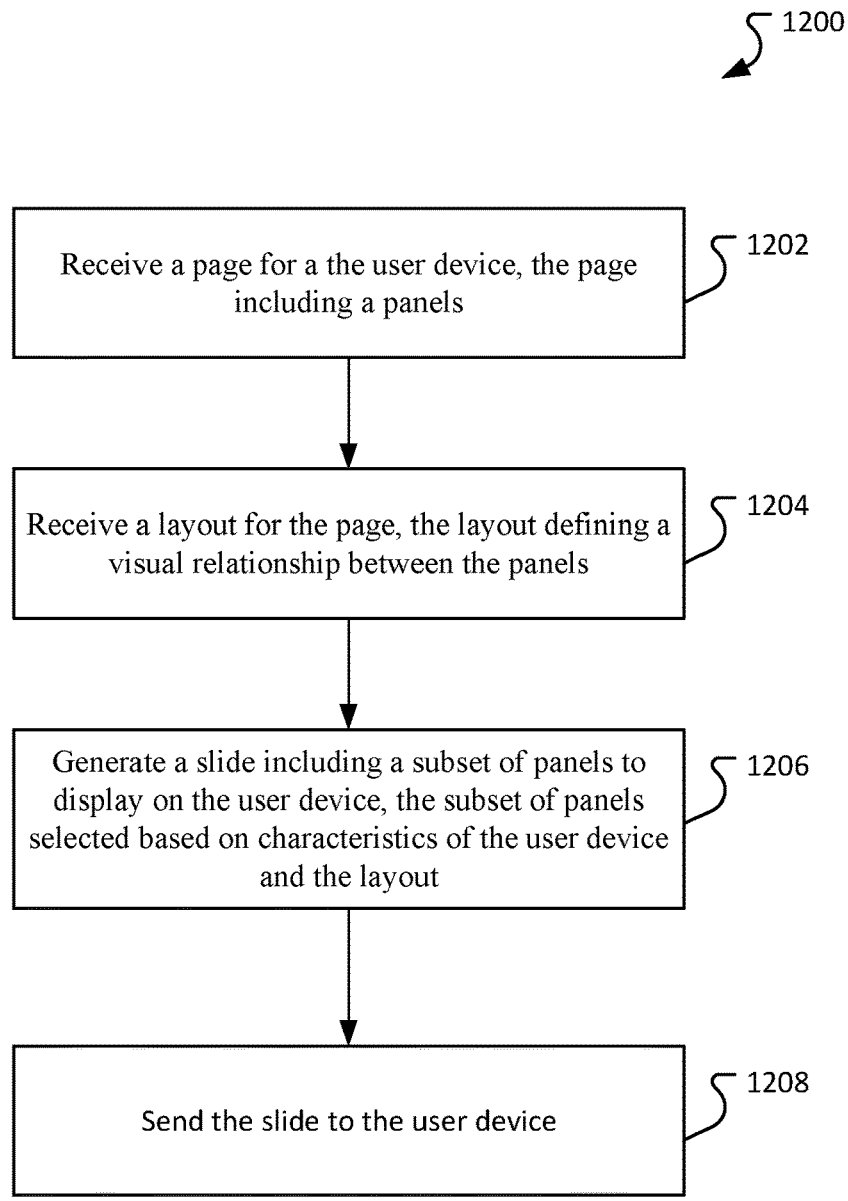
FIG. 12 is a flow chart of an example process for delivering slides to a user device.

In this example, the system determines the panel 312 can be compressed to fit into the available space on the user device. The system then generates a second slide 1002 including panels 304 and panel 306. After the slide 1002 is generated the representation may be represented using the string:

FIG. 12 is a flow chart of an example process 1200 for delivering slides to a user device. The process can be performed by a computer system including a processor and memory. For example, the process may be performed by a web server or a computer system working in conjunction with a web server.

The process 1200 obtains 1202 a page. The page may be requested by a user device (for example, a smart phone, tablet, or other personal computing device, including but not limited to a personal computer). The user device may request the page using, for example, an HTTP request sent over a network (for example, the Internet). The page can be included in, for example, an HTML page. The page can be stored in persistent data storage (for example, in one or more files stored on a file system, in a document management system, or in a database). The page may also be located in temporary storage (for example, an in-memory cache).

The process 1200 obtains 1204 a layout. The layout describes a visual relationship between the panels. For example, one panel may be above another panel. One panel may be next to another panel. The layout may also include groups. The group describes a visual relationship between panels in the group. In some implementations, groups may be nested within groups. A group may be treated identically to a panel within the higher level layout or group.

The process 1200 generates 1206 a slide. Slides can be generated using, for example, the process 700 described above with respect to FIG. 7.

The process 1200 sends 1208 the slide to the user interface. In some implementations, the process generates multiple slides and sends the multiple slides to the user interface in the same response. For example, the process may generate sufficient slides so that each panel on the page is included in at least one slide. In some implementations, the process may generate sufficient slides so that each panel on the page is included in one and only one slide.

A system can dynamically selects columns present based on the size of the screen or the size available for a panel of a displaying device. Tables are a common method to present different pieces of related information. In general, a table has vertical columns and horizontal rows. The number of columns that can presented on the remote devices depends, at least in part, on the size of the display that is allocated to presenting the columns. Tables can refer to database tables, but can also refer to HTML tables or any other structure that presents information in a tabular format.

Traditionally, tables are presented on a display in a fixed format. Columns are defined for the table, as many columns as can fit on the display of the user device are presented. The remaining columns do not appear on the screen. A user may be able to scroll to view the hidden columns. As such, interface designers have to decide whether to place the content in order of importance (for example, placing the most important columns to the left of the report) to increase the likelihood that the information is presented, or to place the content in a logical order of display (for example, placing the most important columns next to other less important columns that provide context) to increase the readability of the report.

The system described below prioritizes the presentation of columns based on the size of the screen on which the table is presented while maintaining the organization. The system increases the likelihood that the most important information is presented and, where possible, presented in the most readable context.

Figure 13:
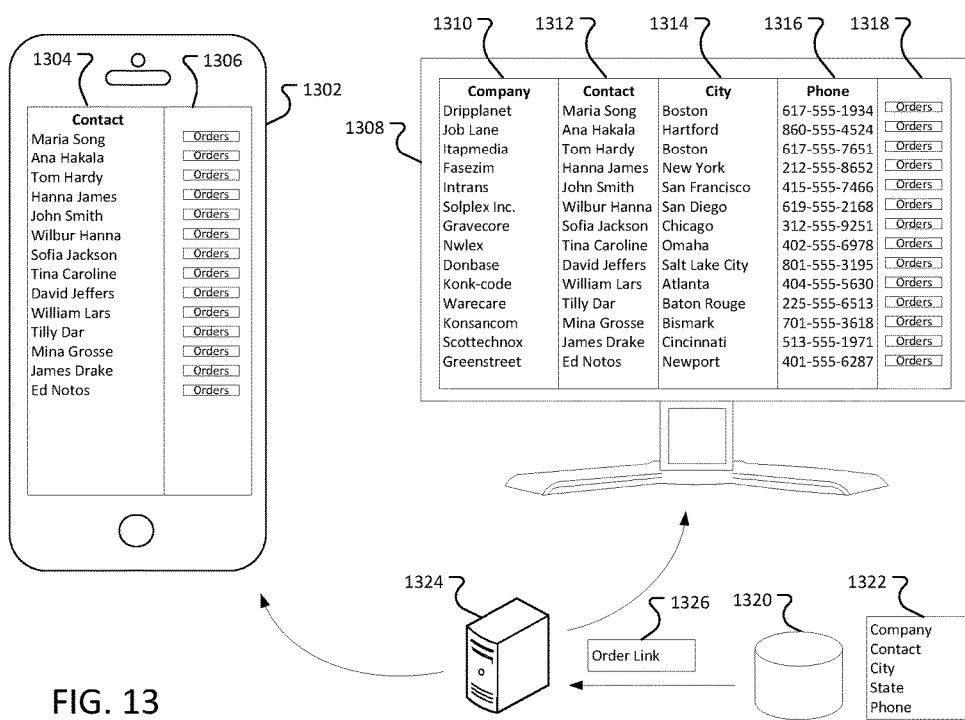
FIG. 13 illustrates the presentation of columns on different devices.

FIG. 13 illustrates the prioritized presentation of columns on display sizes, for example, on different devices. There are a wide variety of different devices that users can use to access distributed content (for example, web pages). A user may use, for example, a smartphone, tablet, and/or personal computer. Each of these devices can have very different display characteristics (e.g. screen size, resolution, orientation, etc.) The columns may be designed to fill the screen or may be included in a part of a screen, for example, the columns may be included in a panel, as described above.

When space to display columns on the screen or in a panel is limited, the columns may be prioritized. For example, some of the information is more important to the user than other information. A customer management system may include a table that includes a company name, a contact, a city, a state, a telephone number, and a link to view individual orders. The contact and the order link may be more important than the other fields and are therefore presented before the other fields.

A system can enable the dynamic presentation of columns depending on the size of the display. The system can select the columns to present based on the size of available space on the display, the size of the columns, and a priority of each column. In general, the priority represents how important it is that a particular item appear on the display. For example, a priority of 1 may indicate that the column must be presented on the display, a priority of 2 or greater may indicate that the column may be presented on the display. In some implementations, the size of the columns can be adjusted by a padding amount that describes the space between the columns.

In this example, computer system 1324 provides columns to present on remote devices (for example, a smart phone 1302 and a personal computer 1308). The computer system 1324 may include, for example, an application server and/or a web server. The computer system 1324 may combine columns from multiple sources before delivering the columns to the remote devices. In this example, the computer system 1324 gathers a set of columns 1322 (e.g. Company, Contact, City, State, and Phone) from a database 1320 and adds an order link column 1326. In some implementations, columns may have a presentation order that is independent of their priority.

In this example, a smart phone 1302 can present two columns, while the computer display 1308 can present five columns.

Priority and presentation order are not absolute and can depend on context. For example, the priority and the presentation order can depend on the application being accessed by the remote device. A column that is critical for some applications may be optional in others.

Figure 14:
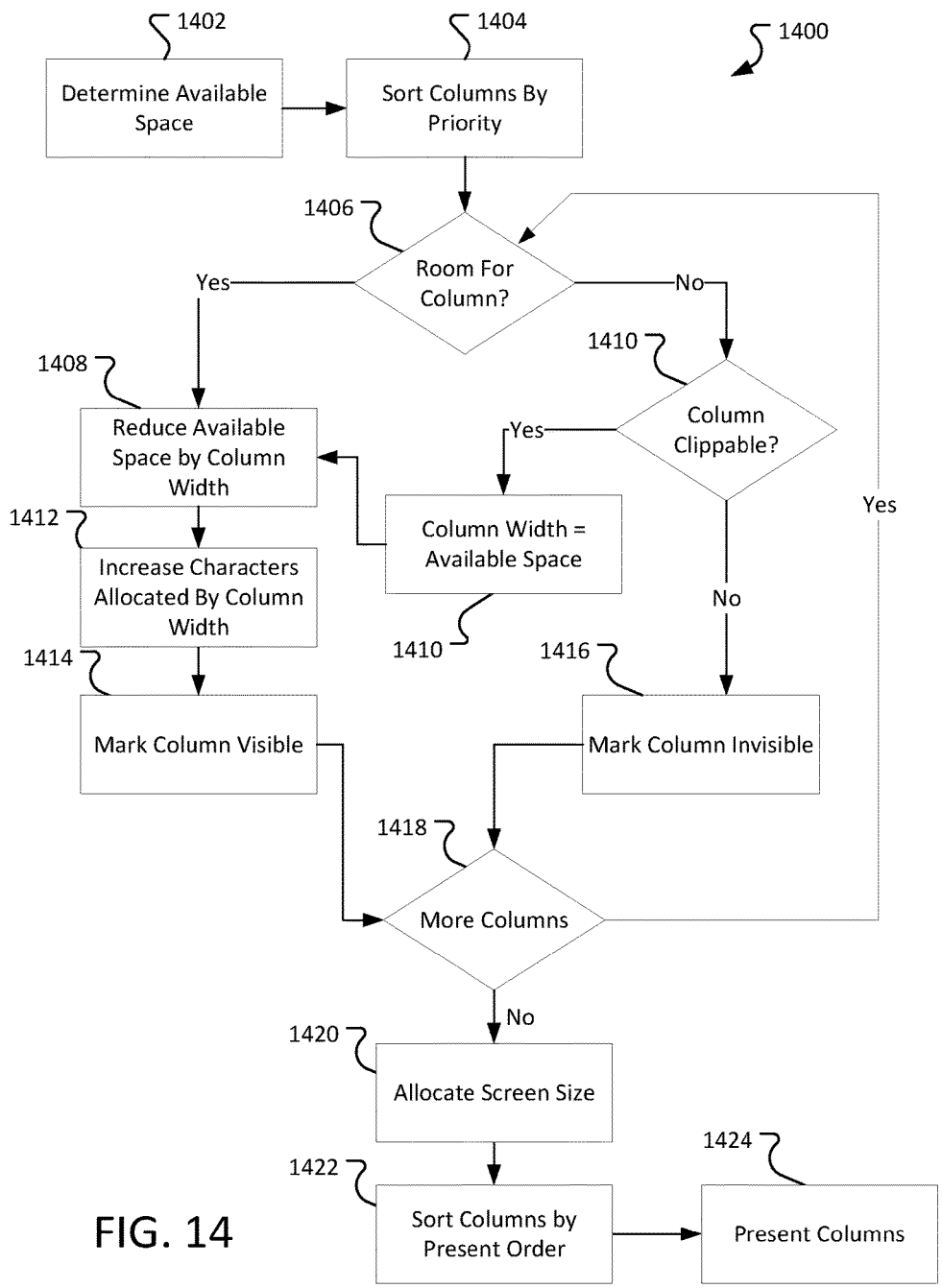
FIG. 14 is a flow chart of an example process for selecting and configuring columns to present on the display.

FIG. 14 is a flow chart of an example process for selecting and configuring columns for presentation on the display. The process can be performed by a computer system that includes at least one computer. A computer can include memory and one or more processors. Operations in the process can be performed using conventional distributed computational techniques. For example, the selection of columns can occur on a web server or other server-side computing device, or may be performed by a user device.

Computer instructions can be stored in the computer that provide instructions to the processor. For example, FIG. 15 illustrates example pseudo-code to perform the process described in FIG. 14. In general, pseudo-code is an informal high-level description of the operating principle of a computer program or other algorithm. It uses the structural conventions of a programming language, but is intended for human reading rather than machine reading. The purpose of using pseudo code is that it is easier to understand and provides an efficient and environment-independent description of the key principles of a process.

The process determines the available space for presenting the columns in a display 1402. General sizing information may be provided by the user device, a configuration file, a web page, or a combination of the above. For example, the remote device may provide the number of pixels in the display.

The system or remote device may calculate a width of the display in characters. As many fonts are proportional (the font includes characters of varying widths), the width of a character may be determined to be the width of the widest character in a predetermined font. Alternatively, the size of the panel may be determined using a pre-determined non-proportional font, which uses a single standard width for all characters. For example, the process may determine that seventy characters can be presented in display. The determined width area allocated to the presentation of the columns is the determined available space. An example of pseudo-code to perform these operations is shown in line 1502. In this example, the uiWidth refers to the width in pixels of the display; characterWidth is the width of a character when presented on the display in pixels. The RoundDown function takes any fractional value and rounds it down to the nearest integer; for example, 70.9 rounds down to 70.

Some operating systems or programming environments provide functions that can be used to determine the width of a particular character. The system may determine the maximum width of any character that may be presented in the column. For example, if the column contains text data, the system may check each displayable character. Alternatively, if the column contains numeric data, the system may check the width of each numeric character. In some implementations, the system may check the width of a subset of the available characters. For example, the system may only check the width of commonly used characters or symbols. Alternatively the system only may check the width of characters that are known to be wide. The system may determine the standard width of a character in near real time or may maintain a lookup table or list of common widths for different fonts and font sizes.

Returning to FIG. 14, the process sorts the columns by priority 1404. Each column may have an associated priority. The priority can indicate the importance of the column relative to the other columns. For example, the priority can indicate which columns must be presented on the display, which columns do not have to be presented on the display, and can provide guidance in selecting the columns to be presented. The process can use any conventional sorting algorithm. In general, sorting algorithms put elements of a list in a certain order. Efficient sorting is important for optimizing the use of other algorithms (such as search and merge algorithms) which require input data to be in sorted lists. Examples of common sorting algorithms include merge sorts, heap sorts, and quick sorts.

The process 1400 determines if there is sufficient remaining space for the first unplaced column in the sorted list 1406. For example, the process can determine whether the available space in the display is greater than the width of the column. In some implementations, the process may add additional padding to account for the spacing between columns on the display. An example of pseudo-code to perform these operations is shown in lines 1506 of FIG. 15. A column is selected. The width of the column is adjusted using a padding factor to account for the spacing between columns and the adjusted width of the column is compared to the available space. In this implementations, the process of comparing the available space to a threshold minimum size is performed prior to checking if the column can be clipped or compressed. In the implementation described in FIG. 15, the system determined whether to display a column in line 1514. In this example, a column is marked as visible if there is space for the column (i.e., available space>0), the priority of the column is set to 1 (e.g. the highest priority), or there have been no columns included (visibleColumns=0). The system presents all high priority columns in the display, regardless of space. The columns may be compressed to fit the available display, as described below.

Returning to FIG. 14, if there is not sufficient remaining space for the column (for example the available width is less than the width of the column), then the process 1400 determines if the column can be clipped 1410. The column that can be clipped indicates that the column width can be substantially reduced (for example, the contents of the column can be truncated to fit into a smaller space). In some implementations, there may be a squeeze threshold defining a minimum size under which a column will not be clipped. For example, the process 1400 may determine not to add a column that can be clipped if the available space is less than a threshold (for example, eight characters). An example of pseudo-code to perform these operations is shown in line 1508 of FIG. 15; this line checks a Boolean value associated with the column that indicates that the column can be clipped.

Returning to FIG. 14, if the column cannot be clipped then the process 1400 marks the column as invisible and moves to the next column in the list. An example of pseudo-code to perform these operations is shown in line 1518 of FIG. 15; this line set the visible property of the column to false.

Returning to FIG. 14, if the column can be clipped then the process 1400 adjusts the column's width to be equal to the available space. An example of pseudo-code to perform these operations is shown in line 1510 of FIG. 15; this line sets the width of the column to the available space.

Returning to FIG. 14, if the process 1400 determines that there is sufficient remaining space for the column in step 1406 or that the column can be clipped and the width of the column is adjusted to the available space then the process 1400 reduces the available space by the width of the column 1408. An example of pseudo-code to perform these operations is shown in line 1512 of FIG. 15; the value of the availableSpace variable is reduced by the width of the column.

Returning to FIG. 14, the process 1400 increases the characters allocated count by the column width 1412. The characters allocated count is an indication of the amount of space in the display that has already been allocated. In some implementations, the characters allocated count can be calculated by subtracting the available width from the size of the area in which the columns are to be presented. An example of pseudo-code to perform these operations is shown in line 1516 of FIG. 15; this line increments the value of a characters allocated validation by the width of the column.

Returning to FIG. 14, the process 1400 marks the column as visible or invisible 1414. An example of pseudo-code to perform these operations is shown in line 1518 sets a property that indicates the column should be presented to true.

The process 1400 determines if there any more columns to process 1418. If there are more columns to process than the process 1400, determine if there is sufficient remaining space for the next column by returning to step 1406.

If there are no more columns to process, the process 1400 allocates the display size to the columns 1420. In general, it's preferable if there is not a large amount of white space at the end of the table. Therefore, the process determines a percentage of the display size to be allocated to each of the columns. In some implementations, the process 1400 may determine the percentage of the display to be allocated to a column using the formula:

$$\text{percent} = \text{column width} / \text{allocated width} \quad (1)$$

For equation 1, percent is the calculated percent of the display that is allocated to the column, column width is the width of the respective column, and allocated width is the total width of all the columns that will present on the display.

An example of pseudo-code to perform these operations is shown in line 1522 and 1524 of FIG. 15. In the example, the process loops through the columns and calculates a percent space for each column that has a visible property set to a Boolean value of 'true'.

Returning to FIG. 14, the process 1400 sorts the columns by display order 1422. As described above, the columns can be sorted using a conventional sorting algorithm.

The process 1400 presents the columns 1424. The process 1400 prepares the columns that are marked as visible for presentation on the display of the user device. The process may, for example, assign a presentation width to each column based on the size of the display and the calculated percentage. An example of pseudo-code to perform these operations is shown in line 1526.

In some implementations (for example, on the smart phone, tablet, or personal computer), the system can cause the columns to be presented on the display. In other implementations, the system can initial the presentation of the columns on the display.

Figure 16A:
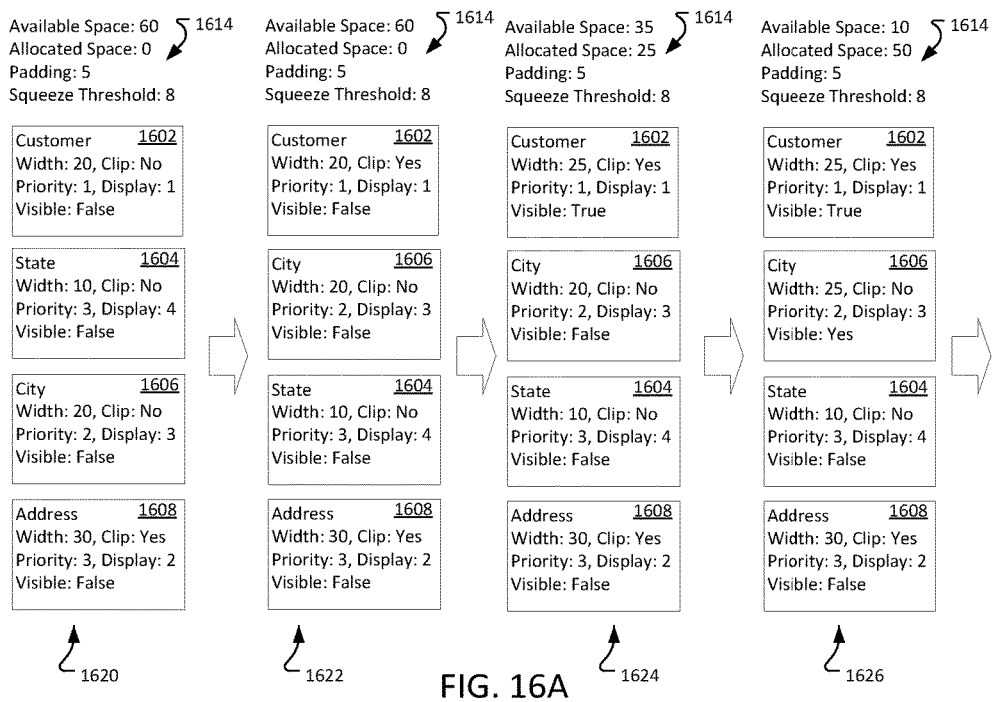
FIG. 16A-16B illustrate an example of applying the process to a set of columns.
Figure 16B:
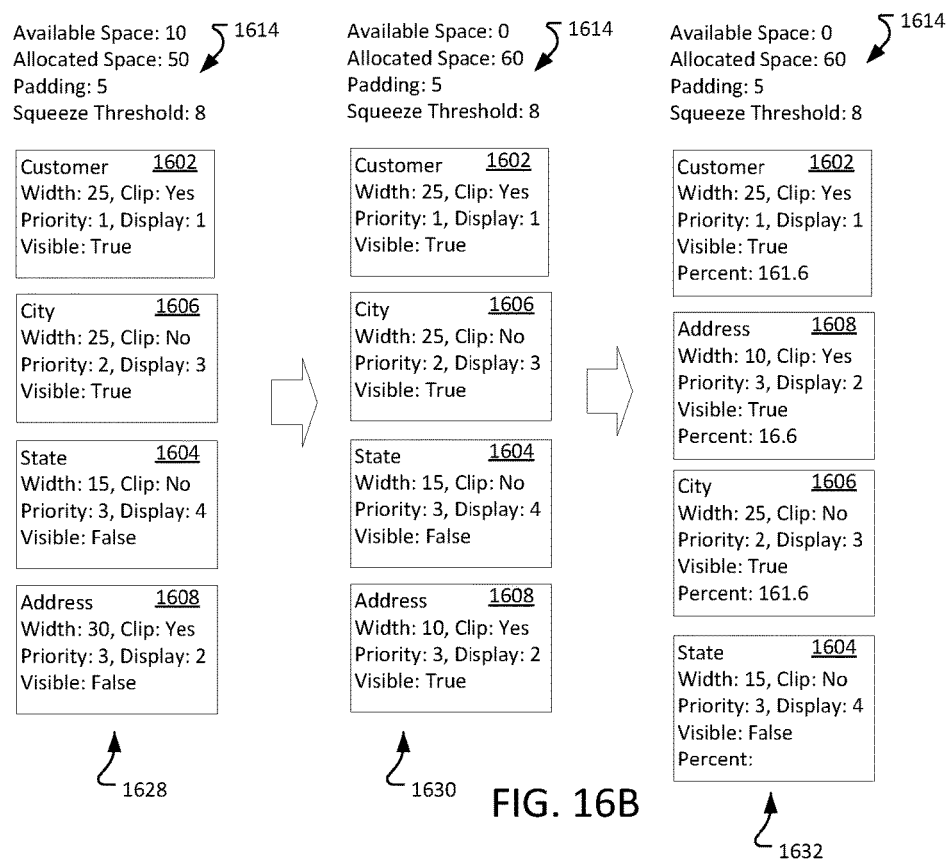

FIG. 16A-16B illustrate an example of applying the process 200 of FIG. 14 to a set of columns. In this example, for clarity of explanation, the process is selecting columns to display from four columns, however, the process can be applied to any number of columns. The figure shows a series of states of data structures which contain column description information.

Referring to FIG. 16A, the system determines the available space. The amount of available space can be determined as described above. In this example, the system determines that the table can display 60 characters. The system also determines that the padding between cells is five characters. The amount of padding between cells can be determined by a designer. In this example, the number five is selected for simplicity. The cell padding can be of any size. The squeeze threshold is eight. In this example, the process will not clip any column if the available size is less that the squeeze threshold. In other words, the squeeze threshold represents the smallest possible size for a clipped column.

In this example, the system determines that the available space is 60 characters in width. The available space, allocated space, and column padding may be stored in one or more data structures 1614.

The system obtains column information. In a first state 1620, the customer column information 1602 describes that the customer column has a width of 20 characters, cannot be clipped, has a priority of 1, has a display order of 1, and is currently not-visible. The state column information 1604 describes that the state column has a width of 10 characters, cannot be clipped, has a priority of 3, has a display order of 4, and is currently not-visible. The city column information 1606 describes that the city column has a width of 20 characters, cannot be clipped, has a priority of 2, has a display order of 3, and is currently not-visible. The address information 1608 describes that the address column has a width of 30 characters, can be clipped, has a priority as 3, has a display order of 2, and is currently not-visible.

The system sorts the claims by priority. In a second state 1622, the column information data structures have been sorted based on priority, therefore, customer column information 1602 is first, the city column information 1606 is second, the state column information 1604 is third, the address column information 1608 is fourth.

A third state 1624 illustrates the results of processing the customer column. The system increases the width of the customer column by the padding (e.g. increasing from 20 to 25). There are 60 available characters and the width of the customer column is 25 characters. Because 60 is more than 25, there is sufficient remaining space for the customer column. In some implementations, because the customer column has the highest possible priority (e.g. 1), the customer column may be included automatically.

The system reduces the available width (60) by the width the customer column (25). The system also increases the allocated space by 25. In the third state 1624, the available width is 35. The system then updates the customer columns information to indicate the customer column should be visible.

The process selects the next column in order of priority (in this case the city column) and continues processing.

A fourth state 1626 illustrates the results of processing the city column. The system increases the width of the city column by the padding (e.g. increasing from 20 to 25). There are 35 available characters and the width of the city column is 25 characters 35 is more than 25, therefore, there is sufficient remaining space for the city column.

The system reduces the available width (35) by the width the city column (25). The system also increases the allocated space by 25. In the fourth state 1626, the available width is 10 and the allocated space is 50. The system updates the city columns information to indicate the city column should be visible.

The process selects the next column (in this case, the state column) and continues processing.

Referring to FIG. 16B, a fifth state 1628 illustrates the results of processing the state column. The system increases the width of the state column by the padding (e.g. increasing from 10 to 15). There are 10 available characters and the width of the state column is 15 characters. Due to the fact that 10 is less than 15, there is not sufficient remaining space for the state column.

The system determines if the state column can be clipped. As shown in the state column information 1604, the state column cannot be clipped, therefore, the system marks the state column as not visible.

The process selects the next column (in this case, the address column) and continues processing.

A sixth state 1630 illustrates the results of processing the address column. The system increases the width of the address column by the padding (e.g. increasing from 30 to 35). There are 10 available characters and the width of the address column is 35 characters. 10 is less than 35, therefore, there is not sufficient remaining space for the address column.

The system determines if the address column can be clipped. In this example, the address column can be clipped. The system also determines that the available size (10) is greater than the squeeze threshold (8), therefore the system sets the width of the address column to the available space. In this example, the width of the address column is set to 10.

The system reduces the available width (10) by the width the address column (10). The system also increases the allocated space by the column width (10). In the fourth state 1626, the available width is zero and the allocated space is 60. The system updates the address columns information to indicate the address column should be visible.

A seventh state 1632 illustrates the state after the display is allocated and the columns are sorted by display order. The system allocates the available display size between the columns because there are no more columns to process. The customer column receives 41.6% of the display size, 25/60. The address column receives 16.6% of the display size, 10/60. The state column receives 41.6% of the display size, 25/60.

Figure 17:
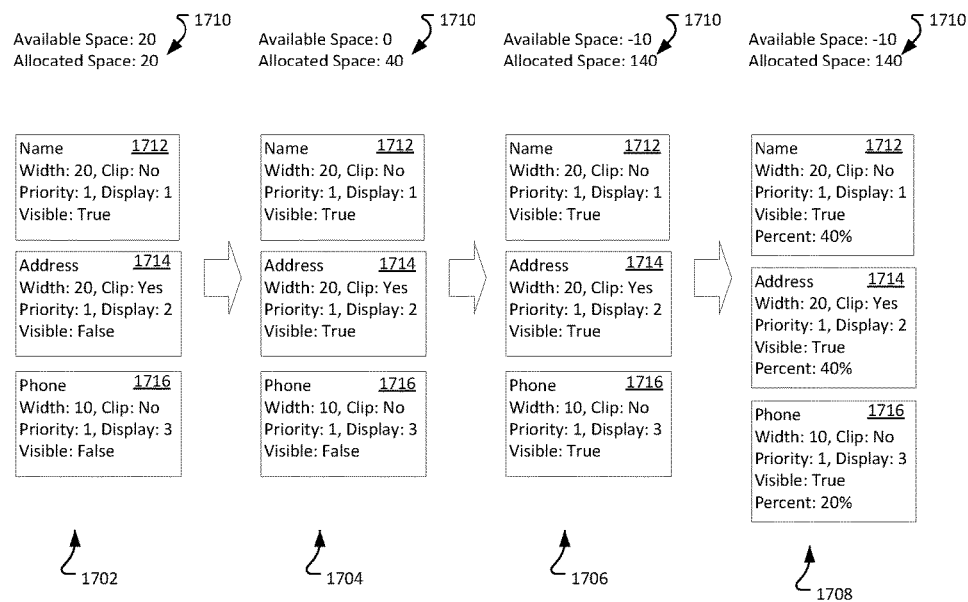
FIG. 17 illustrates an example of applying the process to a set of columns when the required size exceeds the available size.

FIG. 17 illustrates an example of applying the process to a set of columns when the required size exceeds the available size. For simplicity, padding and the squeeze threshold will be ignored (e.g. assumed to be zero). In this example, the system is processing three columns: Name 1712 (width of 20), Address 1714 (width of 20 characters), and Phone 1716 (width of 10 characters). Each of the columns have a priority value set to 1, indicating that each column must be presented on the display.

The first state 1702 occurs after the system determines to include the Name column. This determination can occur in a manner similar to those discussed above with respect to FIGS. 4A and 4B. Once the system has determined to display the name column, the available space is 20 and the allocated space is 20, as shown by the data structures 1710.

The second state 1704 illustrates the results of processing the address column. There are 20 available characters and the width of the address column is 20 characters, therefore, the system marks the address column as visible. The available space is reduced by the width of the address column to 0, and the allocated space is increased by the width of the address column to 40.

The third state 1706 illustrates the results of processing the phone column. There are no available characters and the width of the phone column is 10 characters. There is insufficient space to include the phone column, however, because the priority of the phone column is 1 (highest priority) the system decreases the available space by the width of the phone column to −10, increases the allocated space by the width of the phone column to 50, and marks the phone column visible.

In order to account for the system having allocated more space to the columns than is available in the display, the system proportionally adjusts the width of each column. The fourth state 1708 illustrates the state after the display is allocated and the columns are sorted by display order. The system allocates the available display size between the columns because there are no more columns to process. As described above, the percent of the display that is allocated to each column is equal to the width of the column divided by the allocated space. The name column receives 40% of the display (e.g., 20/50), the address column receives 20% of the display size (e.g., 20/50, and the phone column receives 20% of the display (e.g., 10/50).

As we discussed above, the display is 40 characters wide, therefore, in this example, the name column would have a display width of 0.40*40=16. The address column would have a display width of 0.40*40=16. The phone column would have a display width of 0.20*40=8.

Note, as each column has a display width that is less than the width of the column, some data in the column may need to be truncated. In order to truncate the data, the system may remove the last few characters of the data and replace them with an ellipse (i.e. ' . . . '). The ellipse notifies the user of the remote device that additional data is available but was truncated.

In some implementations, the system elects to truncate columns that can be clipped before truncating columns that cannot be clipped. Columns that can be clipped may be reduced in width before columns that cannot be clipped.

In the example above, the address field is marked as able to be clipped, while the name and address fields are not. Rather than reducing the width of each field, the system may reduce the width of the address field by the amount necessary so that the other fields do not need to be clipped. For example, the system may allocated 20 characters to the name column, 10 characters to the address column, and 10 characters to the phone column.

In some implementations, columns may have a minimum size. This size can be universally applied to all columns; for example, the squeeze threshold, described above, may represent the minimum column size. In other implementations, each column may have an independent minimum size value.

In some implementations, the system adjusts the width of columns that can be truncated down to their minimum length and then applies any remaining truncation to the columns that cannot be clipped. For example, assume that address has a minimum size of 15. The system may reduce the size of the address field to the minimum 15. The remaining 5 characters may be distributed proportionally between the name and phone columns.

As discussed above, columns included in a panel can be adjusted using the processes described above in order to enable a partial panel to be displayed on a user device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions), encoded on computer storage medium for execution by, or to control the operation of, data processing apparatus.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)), to name just a few. Devices suitable for storing computer program instructions and data include all forms of non-transitory computer-readable media and memory devices, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining a size of a table in a display area;
   obtaining column descriptors, each column descriptor identifying a column, a column width and a minimum column width, wherein at least one column descriptor includes a column width different from the minimum column width;
   on a device, automatically gathering a set of columns from one or more applications;
   from the set, determining a set of columns to present, including:
      including a high priority column based on a determination that the high-priority column is required;
      comparing the column width of a column to an available size remaining in the display area after accounting for the width of the high priority column, and
      including the first column in the set in response to determining that the column size is less than the available size;
      comparing the minimum column width of a second column to the available size remaining in the display area after accounting for the column width of the high priority column and the first column, the minimum column width of the second column being different from the column width of the second column;
      excluding the second column from the set in response to determining that the minimum column size of the second column is greater than the available size remaining;
   calculating an aggregate width of all the columns in the set;
   allocating a portion of the size of the table to each column in the set of columns based on a ratio of width of the respective column and the aggregate width of the table; and
   presenting the columns in the set of columns on the display area.

2. The method of claim 1, further comprising adjusting the column width of the column by a column padding factor.

3. The method of claim 1, further comprising sorting the column descriptors based on a priority associated with each column.

4. The method of claim 1, further comprising determining to include a column in the set based on a priority associated with of the column.

5. The method of claim 1, further comprising determining whether a column can be compressed in response to determining that the column size is greater than the available width; and
   determining to include the column in the set of columns in response to determining that the columns can be clipped.

6. The method of claim 5, wherein determining to include the column comprises determining that available space exceeds a squeeze threshold that defines a minimum length to be allocated to a clipped column.

7. A non-transitory computer storage medium encoded with computer program instructions that when executed by one or more computers cause the one or more computers to perform operations comprising:
   obtaining column descriptors, each column descriptor identifying a column, a column width and a minimum column width, wherein at least one column descriptor includes a column width different from the minimum column width;
   on a device, automatically gathering a set of columns from one or more applications;
   from the set, determining a set of columns to present, including:
      including a high priority column based on a determination that the high-priority column is required;
      comparing the column width of a column to an available size remaining in the display area after accounting for the width of the high priority column, and
      Including the first column in the set in response to determining that the column size is less than the available size;
      comparing the minimum column width of a second column to the available size remaining in the display area after accounting for the column width of the high priority column and the first column, the minimum column width of the second column being different from the column width of the second column;
      excluding the second column from the set in response to determining that the minimum column size of the second column is greater than the available size remaining;
   calculating an aggregate width of all the columns in the set;
   allocating a portion of the size of the table to each column in the set of columns based on a ratio of width of the respective column and the aggregate width of the table; and
   presenting the columns in the set of columns on the display area.

8. The non-transitory computer storage medium of claim 7, further comprising adjusting the column width of the column by a column padding factor.

9. The non-transitory computer storage medium of claim 7, further comprising sorting the column descriptors based on a priority associated with each column.

10. The non-transitory computer storage medium of claim 7, further comprising determining to include a column in the set based on a priority associated with of the column.

11. The non-transitory computer storage medium of claim 7, further comprising determining whether a column can be compressed in response to determining that the column size is greater than the available width; and
    determining to include the column in the set of columns in response to determining that the columns can be clipped.

12. The non-transitory computer storage medium of claim 11, wherein determining to include the column comprises determining that available space exceeds a squeeze threshold that defines a minimum length to be allocated to a clipped column.

13. A system comprising:
    one or more computers and one or more storage devices storing instructions that are operable, when executed by the one or more computers, to cause the one or more computers to perform operations comprising:
       obtaining column descriptors, each column descriptor identifying a column, a column width and a minimum column width, wherein at least one column descriptor includes a column width different from the minimum column width;
       on a device, automatically gathering a set of columns from one or more applications;

from the set, determining a set of columns to present, including:

including a high priority column based on a determination that the high-priority column is required;

comparing the column width of a column to an available size remaining in the display area after accounting for the width of the high priority column, and including the first column in the set in response to determining that the column size is less than the available size;

comparing the minimum column width of a second column to the available size remaining in the display area after accounting for the column width of the high priority column and the first column, the minimum column width of the second column being different from the column width of the second column;

excluding the second column from the set in response to determining that the minimum column size of the second column is greater than the available size remaining;

calculating an aggregate width of all the columns in the set;

allocating a portion of the size of the table to each column in the set of columns based on a ratio of width of the respective column and the aggregate width of the table; and presenting the columns in the set of columns on the display area.

14. The system of claim 13, further comprising adjusting the column width of the column by a column padding factor.

15. The system of claim 13, further comprising sorting the column descriptors based on a priority associated with each column.

16. The system of claim 13, further comprising determining to include a column in the set based on a priority associated with of the column.

17. The system of claim 13, further comprising determining whether a column can be compressed in response to determining that the column size is greater than the available width; and determining to include the column in the set of columns in response to determining that the columns can be clipped.

18. The system of claim 17, wherein determining to include the column comprises determining that available space exceeds a squeeze threshold that defines a minimum length to be allocated to a clipped column.

* * * * *